United States Patent [19]
Dreher

[11] 3,718,247
[45] Feb. 27, 1973

[54] MACHINE FOR THE HELICAL MOVEMENT OF CYLINDRICAL OBJECTS

[75] Inventor: Hans C. Dreher, Dallas, Pa.

[73] Assignee: General Cigar Co., Inc., New York, N.Y.

[22] Filed: Dec. 22, 1970

[21] Appl. No.: 100,578

[52] U.S. Cl..................198/127, 64/2 R, 131/20 A, 214/339
[51] Int. Cl........B65g 13/02, B65h 51/26, F16c 1/02
[58] Field of Search......198/127, 167; 214/338, 339; 131/20, 20 A, 59; 64/2 R

[56] References Cited

UNITED STATES PATENTS

| | | | |
|---|---|---|---|
| 2,753,040 | 7/1956 | Rasmussen | 214/339 |
| 3,467,108 | 9/1969 | Wallace | 131/20 A |
| 3,331,288 | 7/1967 | Kolthoff, Jr. | 64/2 R X |

Primary Examiner—Evon C. Blunk
Assistant Examiner—H. S. Lane
Attorney—Paul W. Garbo

[57] ABSTRACT

In a machine, cylindrical objects are helically moved by passing them longitudinally through an elongated guide to a set of three skewly positioned rollers connected by flexible shafts to sprockets which have their axes parallel to and equally spaced around the axis of the cylindrical objects in the elongated guide and are driven from a common source of power so that all the rollers rotate at the same rotational speed in the same rotational direction. The cylindrical surface of each object in the series passing through the guide is contacted by the three rotating rollers to impart both rotational and translational motion to each cylindrical object. The machine is particularly useful in helically wrapping cigar bunches with a ribbon of tobacco sheet.

9 Claims, 4 Drawing Figures

INVENTOR
HANS C. DREHER

BY Paul W. Garbo
AGENT

MACHINE FOR THE HELICAL MOVEMENT OF CYLINDRICAL OBJECTS

BACKGROUND OF THE INVENTION

This invention is an improvement of the apparatus described and claimed in U.S. Pat. No. 3,467,108. That prior apparatus is for the helical movement of cylindrical or rod-shaped objects, and more particularly for the continuous application of a helical wrapping on rod-shaped objects such as helically wrapping a ribbon of tobacco sheet on cigar bunches aligned in end-to-end relation.

While the machine described in U.S. Pat. No. 3,467,108 was a distinct advance over conventional cigar-making machines because it became possible to wrap hundreds of cigar bunches per minute, experience revealed that certain limitations were inherent in the equipment. The two sets of three skewly arranged driven rollers mounted on three fixed arms equally spaced around the axis of serially advancing cigar bunches were found to have such undesirable features as difficulty in changing the machine to accommodate cigar bunches of different diameter, maintenance problems, and expensive and cumbersome construction.

It is an object of this invention to provide an improved apparatus for the helical movement of rod-shaped objects particularly useful in the continuous application of a helical wrapping on the rod-shaped objects.

A further object is to provide an apparatus which is more easily adjusted to convey rods such as cigar bunches of different diameters and in which there is greater accessibility to all its parts.

These and other objects and advantages of the invention will be apparent from the description which follows.

SUMMARY OF THE INVENTION

In accordance with this invention, cylindrical objects such as cigar bunches aligned in end-to-end relation and passing through a rectilinear guide are encompassed by a set of three skewly arranged driven rollers spaced equally around the axis of the cigar bunches issuing from the rectilinear guide. The three driven rollers are adjustably mounted on a frame which usually is adjustably held on a track in tandemly spaced alignment with other sets of driven rollers. The track is parallel to the axis of the cigar bunches in the rectilinear guide. Each frame supports three timing sprockets on one of its sides, the sprockets being equally spaced around, and with axes parallel to, the axis of the cigar bunches in the rectilinear guide. A flexible shaft connected to each of the three timing sprockets extends through a skewly arranged bearing adjustably held on the other side of the frame. The three bearings are equally spaced around the axis of the cigar bunches moving serially through the machine. A roller mounted in each bearing is connected to the free end of the flexible shaft passing through that bearing. The three timing sprockets are connected to a power source by means of a timing belt or chain to drive the three sprockets and their associated flexible shafts and rollers at the same rotational speed and in the same rotational direction.

In a preferred embodiment of the invention, four sets of the three driven rollers are tandemly spaced from each other in two pairs and disposed with the three driven rollers of one set in each pair facing the three driven rollers of the other set. Both sets of three driven rollers of the first pair and the set of three driven rollers on the charging end of the second pair are rotated at the same rotational speed slightly slower than the set of three driven rollers on the discharge end of the second pair. A ribbon of tobacco sheet with paste on its underside is introduced obliquely between the first pair of sets of three driven rollers and helically wrapped over and adhered to the cigar bunches serially advanced by the rotational and translational motion imparted by the tangential contact of the peripheries of the three driven rollers of each set with the cylindrical surface of each bunch. The first pair of sets of three driven rollers with the ribbon of tobacco sheet introduced obliquely therebetween is functionally the full equivalent of and the improved replacement of the machine shown in FIGS. 1 and 2 of U.S. Pat. No. 3,467,108. A cutting device is positioned between the two sets of three driven rollers of the second pair to sever the ribbon of tobacco sheet where it links together the serially wrapped cigar bunches.

BRIEF DESCRIPTION OF THE DRAWINGS

For a better understanding of the invention, reference is made to the accompanying drawings which illustrate a preferred embodiment and of which.

DESCRIPTION OF THE PREFERRED EMBODIMENT

Figure 1:
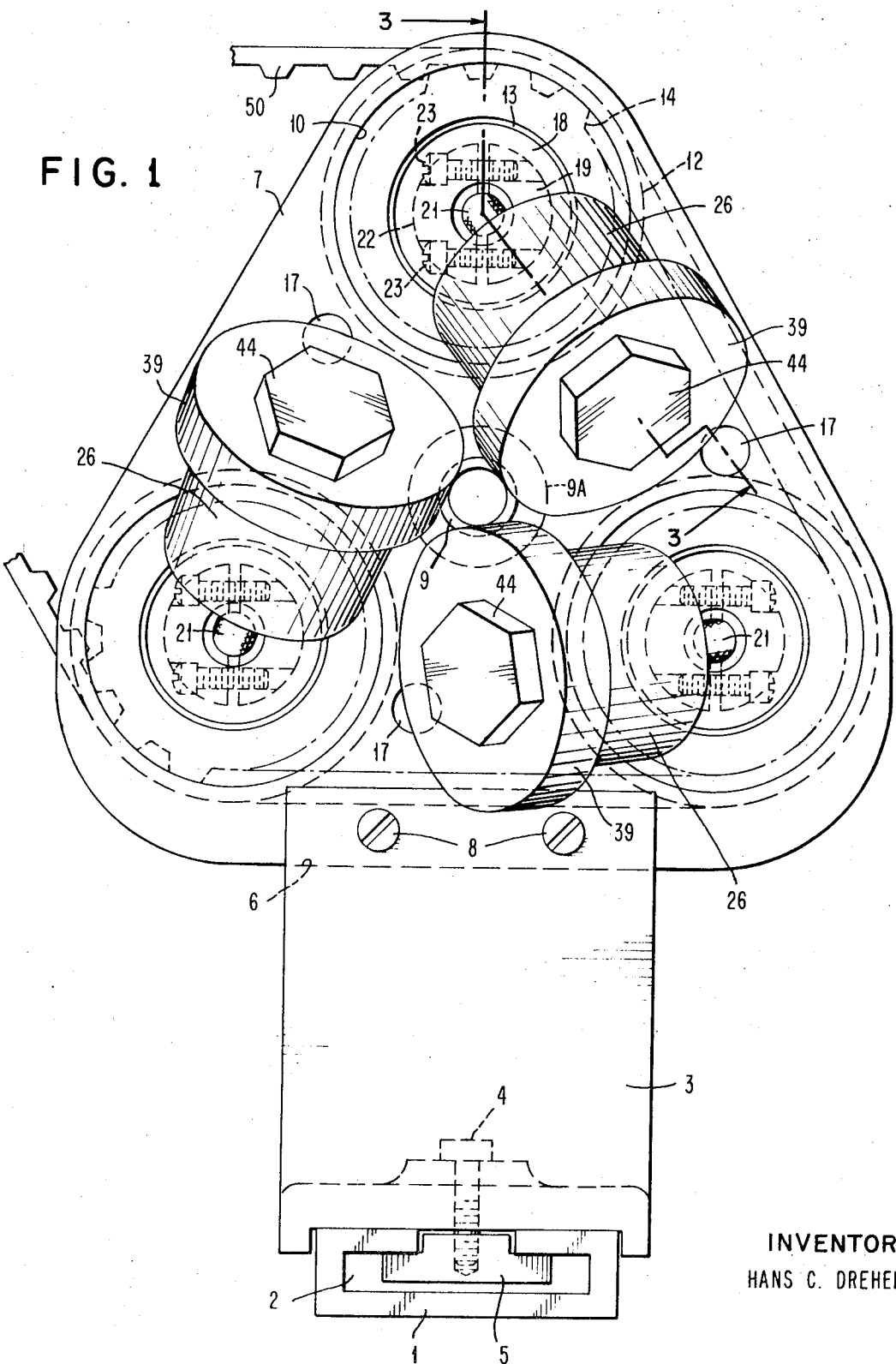
FIG. 1 is a front view of one set of three rollers skewly arranged about the axis of the elongated guide through which rod-shaped objects are brought into contact with the three rollers.
Figure 2:
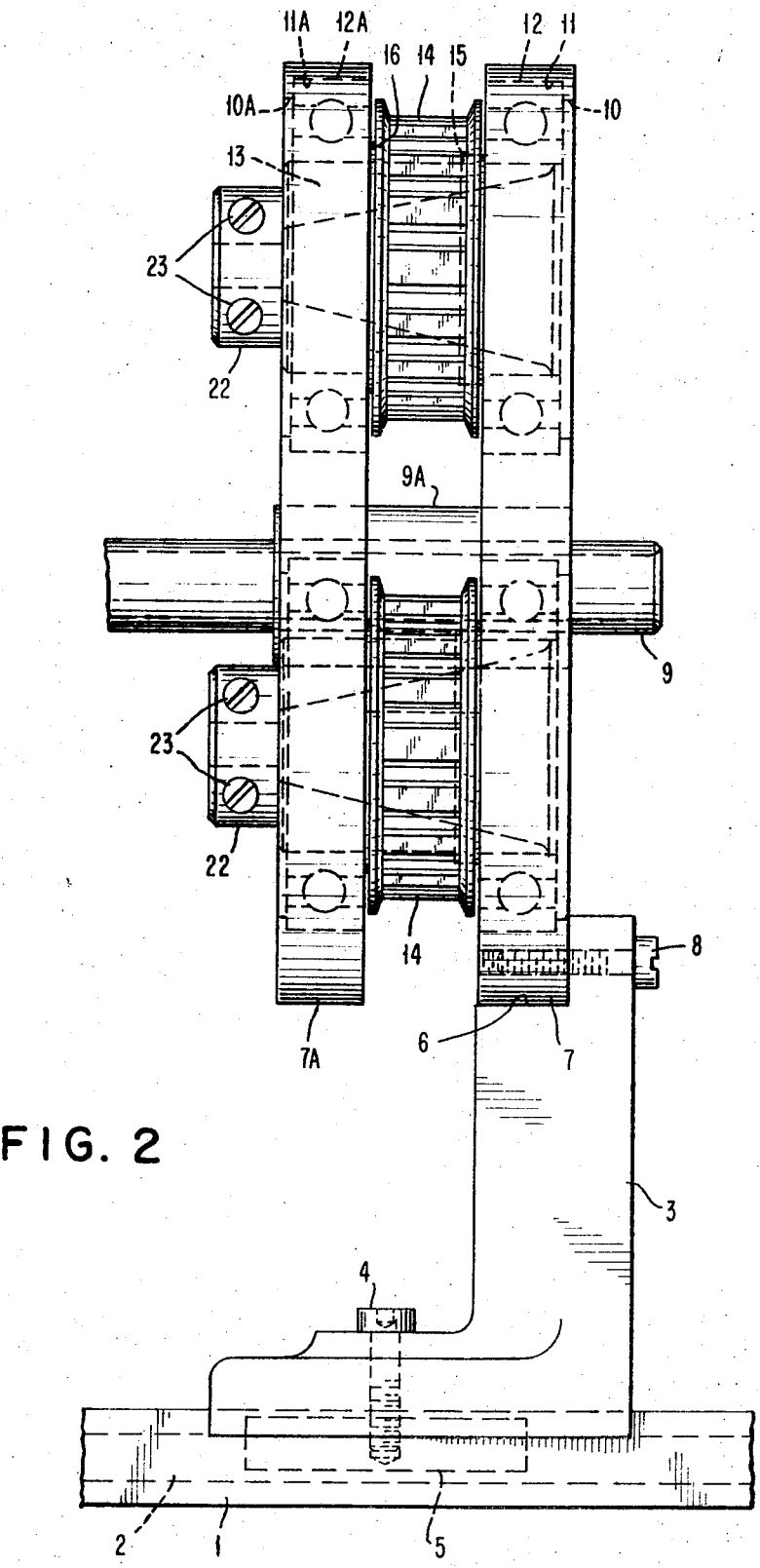
FIG. 2 is the left side view of the unit shown in FIG. 1 except that the timing belt and the brackets with the three rollers have been removed.

The machine shown in FIGS. 1 and 2 is mounted on track 1 having slot 2. Base 3 of the machine is held at any desired point on track 1 by screw 4 passing through base 3 to locking plate 5 in slot 2. The upright portion of L-shaped base 3 has a horizontal cut-out 6 along its upper edge. The bottom portion of substantially triangular plate 7 fits in cut-out 6 and two screws 8 passing through base 3 fasten plate 7 thereto.

Guide tube 9 for aligning a series of longitudinally arranged rods like cigar bunches passes normally through plate 7 near its center and terminates a short distance away from the face of plate 7. Sleeve 9A holds tube 9 in place. Equidistant from the center of tube 9 in triangular plate 7 near each of its three corners is a circular aperture 10 and a larger counter-bore 11 extending inwardly from the back of plate 7. An annular ball-bearing 12 is fitted in each counter-bore 11.

In back of triangular plate 7 is a substantially similar back-up plate 7A which has a corresponding circular aperture 10A, larger counter-bore 11A and annular ball-bearing 12A near each of its three corners. Plates 7 and 7A are aligned in spaced back-to-back relation. Sleeve 13 with sprocket-pulley 14 mounted thereon is fitted with its opposite ends in annular ball-bearings 12 and 12A at each of the three corners of plates 7 and 7A. A ring projection 15 on the outer surface of each sleeve 13 bears against annular ball bearing 12 and pulley 14 so as to space pulley 14 from bearing 12. Washer 16 similarly spaces pulley 14 from bearing 12A. Guide tube 9 and sleeve 9A also pass through plate 7A. Three spacer bolts 17 hold plates 7 and 7A in the desired spaced relation.

Figure 3:
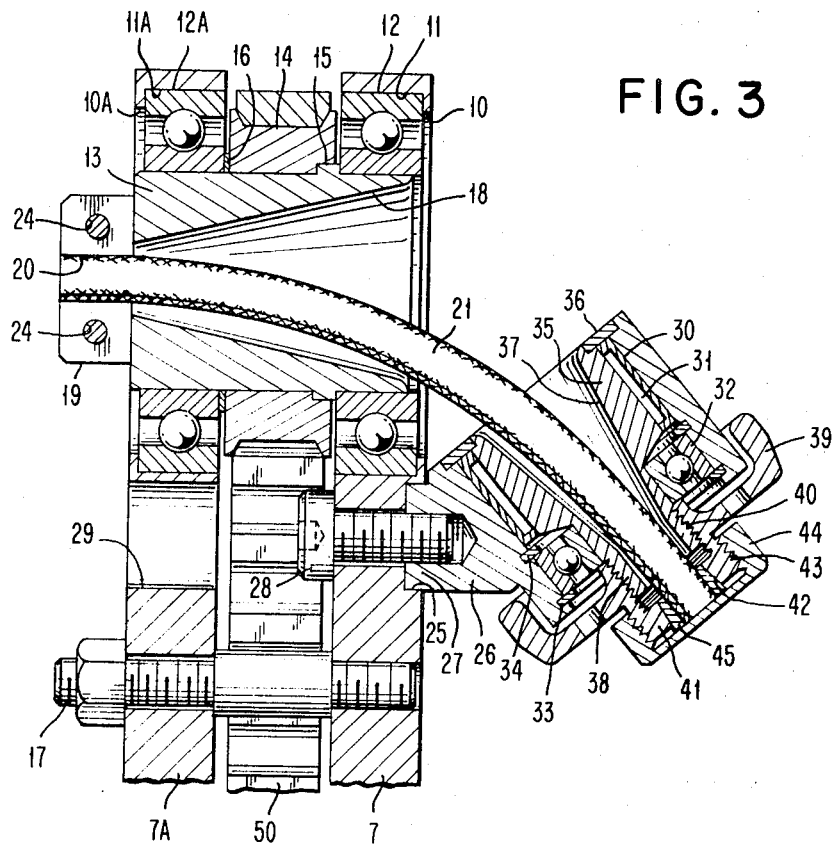
FIG. 3 is a sectional view of the upper portion of FIG. 1 taken along line 3—3 but including a full diametral section of the timing sprocket.

Referring to FIG. 3, sleeve 13 has a generally conical bore 18 extending from the face of plate 7 to the face of back-up plate 7A. Beyond the face of plate 7A, sleeve 13 has projection 19 of diminished diameter through which is bore 20 of a diameter approximately equal to the diameter of flexible shaft 21. Half of projection 19 is cut off. The cut-off portion of projection 19 provides half-ring 22 which has two screws 23 passing therethrough to two threaded holes 24 in the remaining half of projection 19 of sleeve 13. The end of shaft 21 is fastened between projection 19 and half-ring 22 by tightening screws 23 in threaded holes 24.

The face of plate 7 has three flat grooves 25 which are spaced equally around and with the center lines of the grooves radially convergent to tube 9. Each of three brackets or arms 26 has complementary base 27 fitted in one of the three grooves 25 and is fastened to plate 7 by screw 28 passing through a slot in plate 7 into bracket 26. An aperture 29 in back-up plate 7A is aligned with each screw 28 passing through plate 7 so that a tool may be inserted through aperture 29 to loosen and tighten screw 28 when each bracket 26 is moved closer to or farther from tube 9 to accommodate cylindrical objects of smaller or larger diameter, respectively. When brackets 26 are so adjusted, tube 9 is also changed to have an inside diameter appropriate for the cylindrical objects passed therethrough.

One bracket 26 is adjacent each of the three sleeves 13 and has a bore 30 with its axis skewly disposed relative to the axis of tube 9 so that it converges closely toward but does not intersect the axis of tube 9. Annular needle bearing 31 is fitted in bore 30 in the portion adjacent sleeve 13 while annular ball bearing 32 is fitted in the remaining portion of bore 30. C-rings 33 and 34 snapped into complementary grooves in bore 30 hold ball bearing 32 in place. Sleeve 35 is rotatably carried by bearings 31 and 32 while retainer ring 36 holds sleeve 35 in place.

Sleeve 35 has a generally conical bore 37 and is externally threaded at its end 38 projecting slightly beyond bracket 26. Flexible shaft 21 extends through bore 37 and terminates a short distance beyond end 38 of sleeve 35. Roller 39 having threaded bore 40 is screwed on end 38. Projection 41 on roller 39 has bore 42 and external thread 43. Cap nut 44 is screwed on projection 41. Tapered split ring or collet 45 is placed around the end of shaft 21 and in bore 42 before nut 44 is screwed on projection 41. As nut 44 is tightened, collet 45 is firmly wedged between shaft 21 and bore 42 of roller 39. Thus, shaft 21 is locked to roller 39 which is rotatable with sleeve 35.

Figure 4:
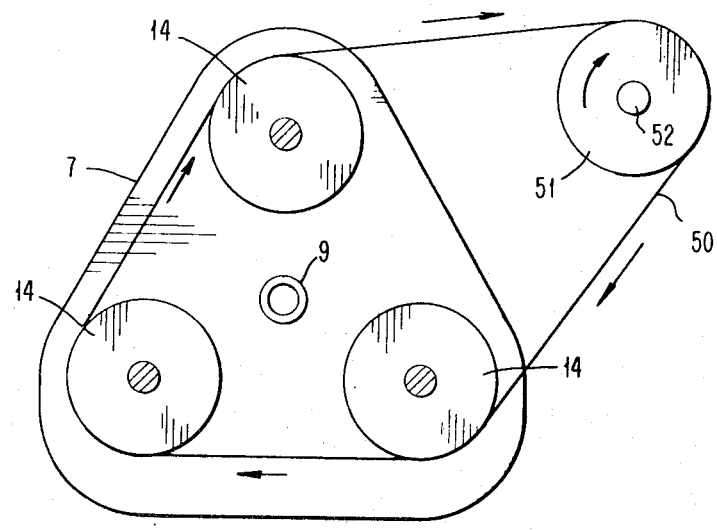
FIG. 4 is a diagrammatic representation of the drive means for the illustrated set of three rollers.

FIG. 4 diagrammatically shows the three sprocket-pulleys 14 on the back of triangular plate 7 and timing belt 50 engaging each pulley 14 as well as sprocket-pulley 51 mounted on drive shaft 52. Shaft 52 is parallel to the axes of pulleys 14 and pulley 51 is in the same plane with pulleys 14. To rotate the three rollers 39 counter-clockwise as viewed in FIG. 1 to effect clockwise rotation and simultaneous translational movement of the cigar bunches through guide tube 9, drive shaft 52 and pulley 51 as viewed in FIG. 4 are rotated clockwise. Actually, all three pulleys 14 and pulley 51 which rotate clockwise in FIG. 4 would be viewed as rotating counter-clockwise in FIG. 1 because FIGS. 1 and 4 are reverse views. For the same reason, cigar bunches passing through tube 9 move in the direction coming out of the plane of FIG. 4 and in the direction going into the plane of FIG. 1.

The machine just described and shown in the drawings is frequently used in pairs. As previously mentioned, two such machines are usually disposed with the three driven rollers of one machine facing the three driven rollers of the other machine. A machine which is the mirror image of the machine described with reference to FIGS. 1 and 4 would helically move the cigar bunches toward the latter machine. While the rollers of the first machine push the cigar bunches toward the latter or second machine, the rollers of the second machine pull the cigar bunches from the first machine.

Customarily, the ribbon of tobacco sheet is helically applied as wrapper on the cigar bunches with a helix angle in the range of about 40° to 50°. To achieve such helical wrapping of cigar bunches, the axis of each sleeve 35 and roller 39 is skewly disposed at an angle in the range of about 40° to 50° with respect to the axis of guide tube 9 through which the cigar bunches are supplied to the set of three rollers 39. After the ribbon of tobacco sheet has been helically applied on the cigar bunches while they are being helically moved between the first and second sets of three rollers 39, a cutting device severs the applied ribbon at the point where it links one cigar bunch with the next cigar bunch in the series while the cigar bunches are being helically moved between the third and fourth sets of three rollers 39. Applicant's copending patent application Ser. No. 92,594, filed Nov. 25, 1970, discloses a cutting machine which is particularly well suited for placement between the third and fourth sets of three rollers 39 to sever the linked cigar bunches that are being helically moved by these two sets of rollers.

It will be evident to those skilled in the art that many variations and modifications of the invention may be made without departing from its spirit and scope. For instance, while the machine of this invention has been described in its preferred simple form with three driven rollers arranged in each set so that the three rollers make simultaneous contact with the cylindrical surface of the rod-shaped objects undergoing helical movement, the machine may have four driven rollers uniformly spaced from each other around the axis of the rod-shaped objects that are simultaneously contacted by the four rollers.

What is claimed is:

1. In a machine for the helical movement of cylindrical objects arranged longitudinally in series having elongated guiding means for said objects, a set of at least three skewly positioned driven rollers uniformly spaced around the axis of said objects to impart by simultaneous contact of their peripheries with the cylindrical surface of said objects both rotational and translational motion to said objects, the improvement which comprises:
- a. a frame comprising two spaced, parallel plates disposed with said guiding means extending normally therethrough;
- b. a timing sprocket for each of said rollers disposed in the space between said two plates and supported by said two plates and uniformly spaced around the axis of said guiding means with its axis parallel to said axis;
- c. a bracket with a bearing for each of said rollers supported on the outside of one of said two plates and uniformly spaced around said axis of said guiding means;
- d. a flexible shaft connected to each said sprocket extending through said two plates and a said bearing and connected at one end to one of said rollers; and
- e. means connecting a drive source to each said sprocket to rotate said sprocket and its associated flexible shaft and roller at the same speed and in the same direction.

2. The improvement of the machine of claim 1 wherein each said bracket is adjustably positioned a predetermined distance from said guiding means.

3. In a machine for the helical movement of cylindrical objects arranged longitudinally in series having elongated guiding means for said objects, at least two sets of three skewly positioned driven rollers uniformly spaced around the axis of said objects to impart by simultaneous contact of the peripheries of said three rollers of each of said sets with the cylindrical surface of said objects both rotational and translational motion to said objects, the improvement which comprises:
- a. a frame for each of said sets of said three rollers comprising two spaced, parallel plates disposed with said guiding means extending normally therethrough, each said frame being spaced from the next said frame;
- b. three timing sprockets for said three rollers of one of said sets disposed in the space between said two plates and supported by said two plates of each said frame and uniformly spaced around the axis of said guiding means with their axes parallel to said axis;
- c. three brackets each with a bearing for each of said three rollers of one of said sets supported on the outside of one of said two plates of each said frame and uniformly spaced around said axis of said guiding means;
- d. three flexible shafts each connected to one of said three sprockets for said three rollers of each of said sets extending through said two plates of a said frame and a said bearing and connected at one end to one of said three rollers; and
- e. means connecting a drive source to each said three sprockets supported by said two plates of each said frame to rotate said three sprockets and their associated flexible shafts and rollers at the same speed and in the same direction.

4. The improvement of the machine of claim 3 wherein one said frame is positioned with its set of three rollers facing the set of three rollers of the next said frame.

5. The improvement of the machine of claim 3 wherein each said frame is adjustably mounted on a rectilinear track so that each said frame may be spaced from the next said frame as desired.

6. The improvement of the machine of claim 5 wherein one said frame is positioned with its set of three rollers facing the set of three rollers of the next said frame.

7. The improvement of the machine of claim 3 wherein each of said three brackets on each said frame is adjustably positioned a predetermined distance from said guiding means extending through said frame.

8. In a machine in which a driven roller is supported by a bracket with a bearing on one outer side of a frame comprising two spaced, parallel plates and said roller is positioned with its axis askew to said outer side of said frame and with its periphery close to said outer side, the improvement which comprises:
- a. a timing sprocket for said roller disposed in the space between said two plates and supported by said two plates;
- b. a first sleeve disposed concentrically within said sprocket, the bore in said first sleeve being substantially conical and having its wider opening adjacent the first-mentioned outer side of said frame;
- c. a second sleeve disposed concentrically within said bearing, the bore in said second sleeve being substantially conical and having its wider opening adjacent said first-mentioned outer side of said frame;
- d. a flexible shaft connected at one end to said roller and extending through said second sleeve and said first sleeve to fastening means attached at the smaller opening of said first sleeve; and
- e. means connecting a drive source to said sprocket to rotate said sprocket and its associated first sleeve, flexible shaft, second sleeve and roller.

9. The improvement of the machine of claim 8 wherein said bracket is adjustably positioned on said frame.

* * * * *